United States Patent Office 3,572,172
Patented Mar. 23, 1971

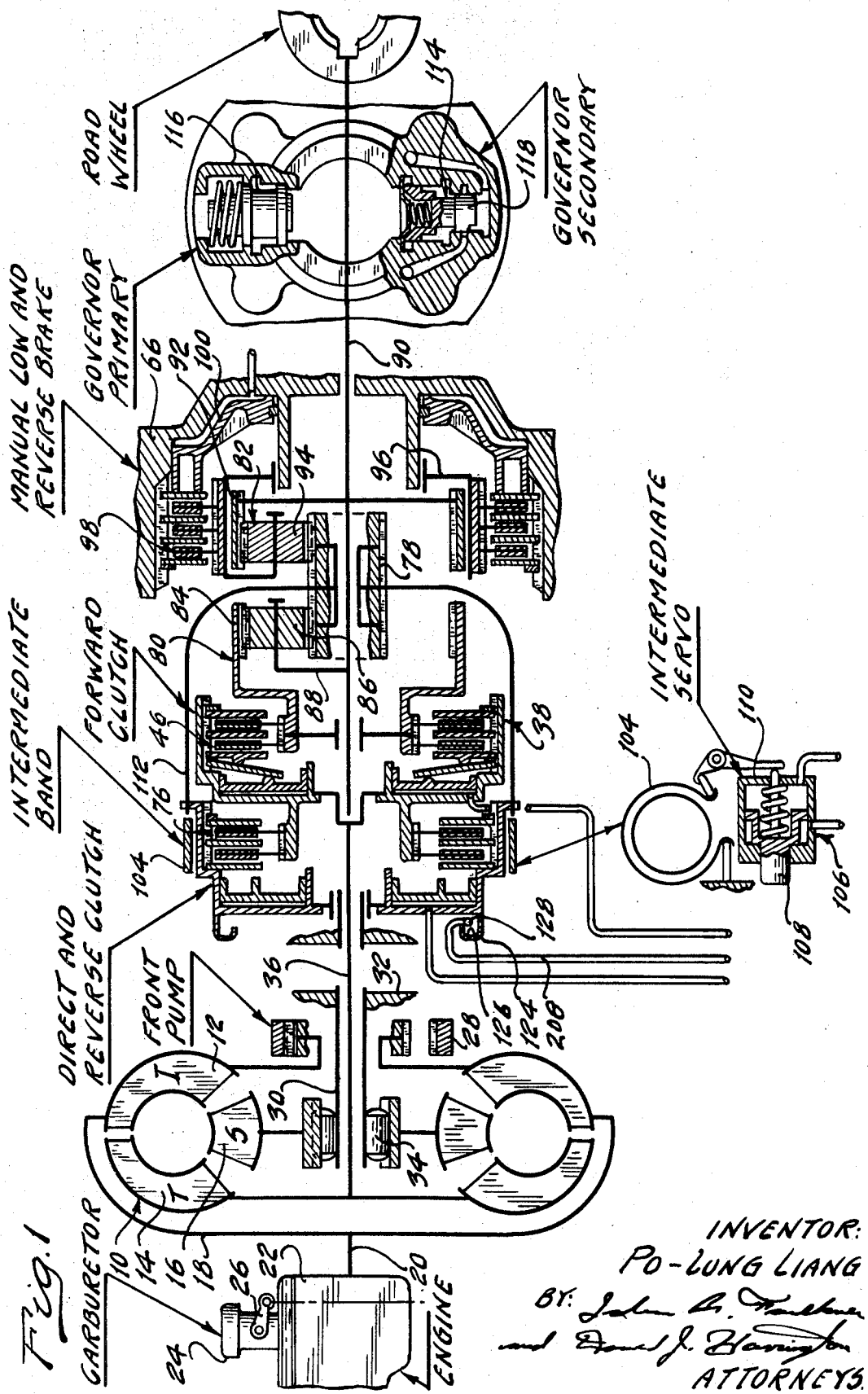

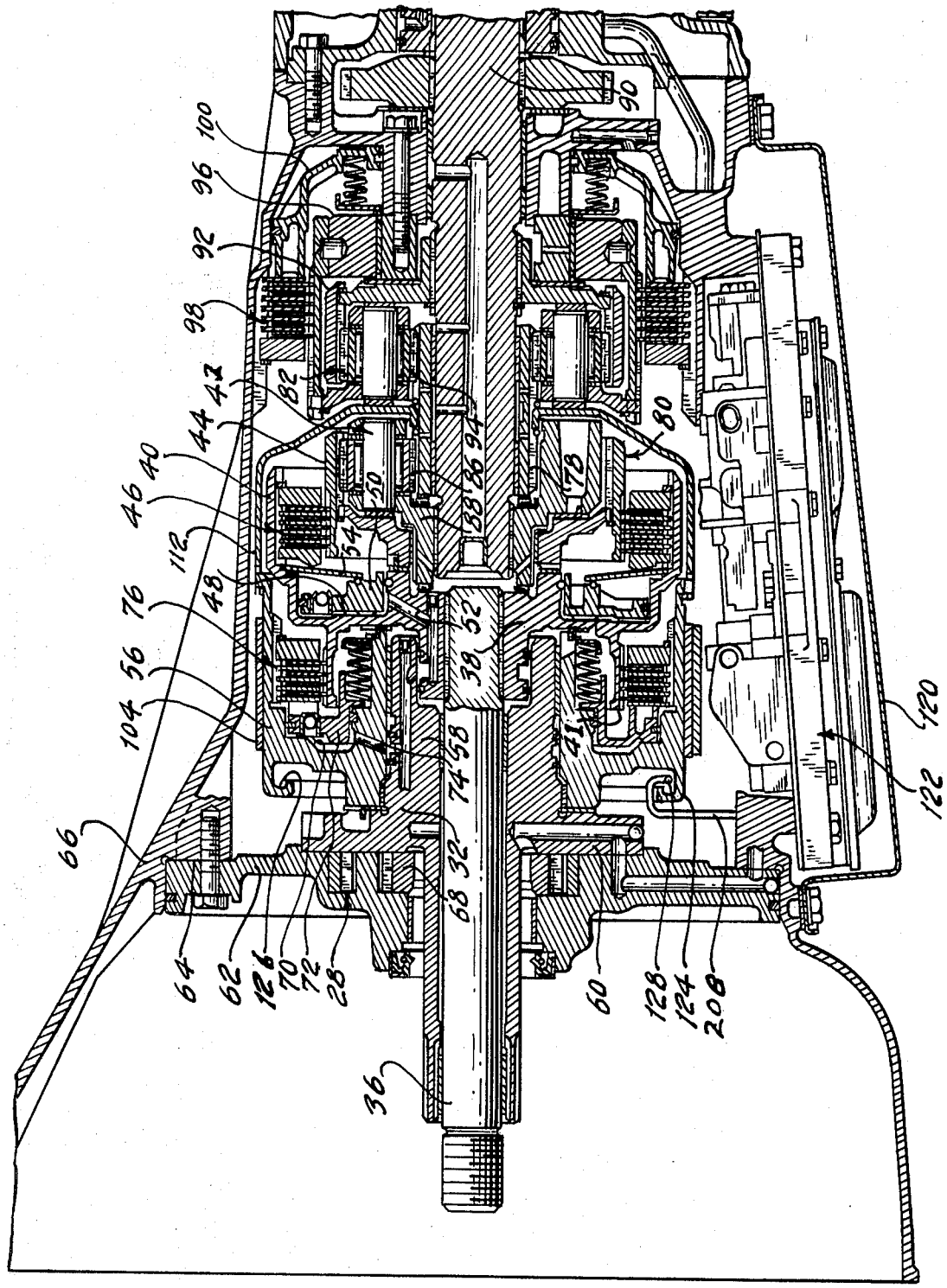

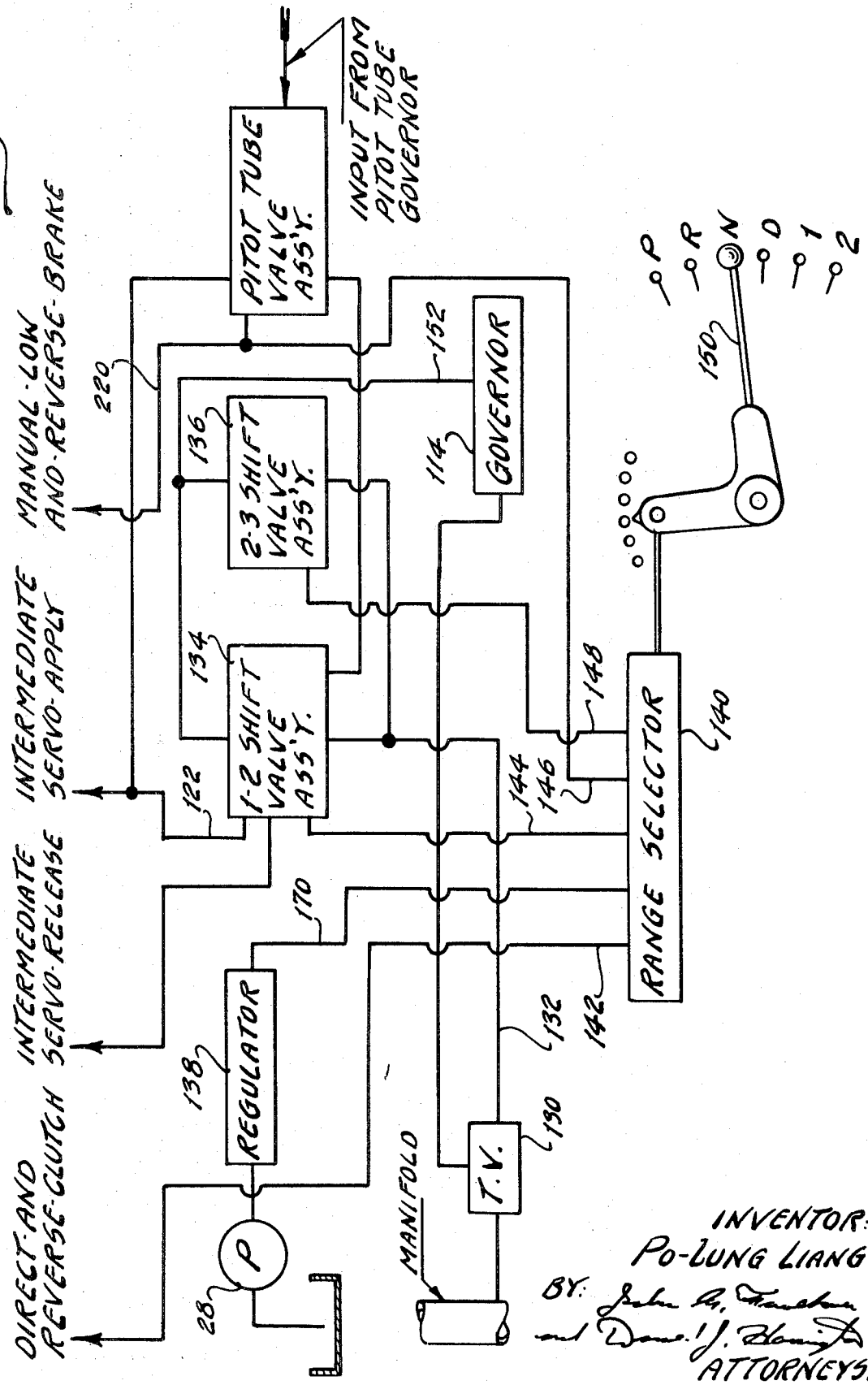

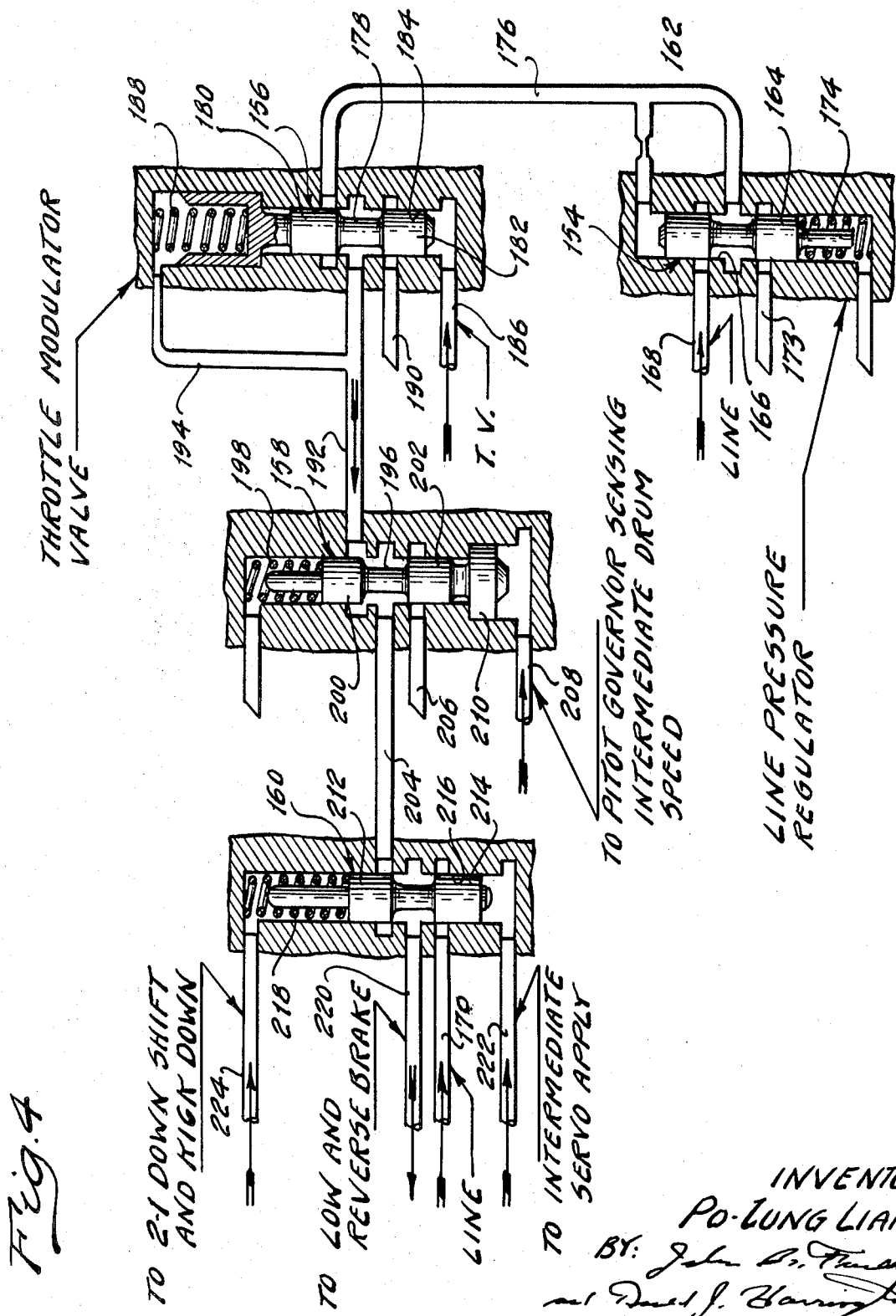

3,572,172
MULTIPLE RATIO TRANSMISSION WITH SPEED
SENSITIVE SHIFT TIMING CONTROLS
Po-lung Liang, Livonia, Mich., assignor to Ford Motor
Company, Dearborn, Mich.
Filed Feb. 24, 1969, Ser. No. 801,591
Int. Cl. B60k 21/10; F16h 5/42
U.S. Cl. 74—864                    13 Claims

ABSTRACT OF THE DISCLOSURE

A multiple ratio planetary gear system wherein the intermediate ratio reaction element of the gear system is caused to rotate as a torque delivery member during low speed ratio operation and wherein automatic ratio changes are achieved by a valve system that senses the speed of that element as a friction brake is applied to the reaction element when the speed of the element approaches zero.

GENERAL DESCRIPTION OF THE INVENTION

My invention is adapted to be used in an automatic control valve system for an automatic power transmission mechanism in an automotive vehicle driveline. Such mechanisms normally include multiple ratio planetary gearing and selectively engageable clutches and brakes for controlling the relative motion of the elements of the gearing thereby establishing any one of several forward driving ratios or a single reverse ratio. One such mechanism is illustrated in U.S. Pat. No. 3,393,585.

In the gear system shown in the aforementioned patent disclosure, a common sun gear is used for each of two simple planetary gear sets. A hydrokinetic torque converter is interposed between the gearing and an internal combustion engine. A direct-and-reverse clutch connects the turbine of the torque converter to the common sun gear during direct drive operation and during reverse drive operation. A forward clutch is applied to establish a driving connection between the turbine and a power input element of the gearing during operation in all forward driving ratios.

The common sun gear acts as a torque delivery element of the gear system during the low speed operation as a split torque delivery path is established between the turbine and the driven member. It rotates under these conditions as torque is transferred between the ring gear of one gear set and the carrier of another. That same gear element, however, serves as a reaction member during intermediate speed ratio operation as the intermediate speed ratio brake is applied to a drum which in turn is connected directly to it.

To effect a smooth transition from the low speed ratio to the intermediate speed ratio, the intermediate brake should be applied when the rotation of the sun gear ceases. This reduces the inertia torque resulting from the rotating mass of the brake drum and the rotating mass of the gear elements, including the sun gear itself. I have achieved this by providing a speed sensor connected to the rotating drum for the intermediate brake. The sensor is adapted to produce a speed pressure signal whenever the brake drum is rotating. The signal falls to a value of zero, however, when the rotating drum becomes stationary.

The resulting change in the magnitude of the signal is used to trigger the operation of a pilot governor valve which in turn distributes a control signal through a pressure distributor valve. This in turn controls pressure distribution to the intermediate brake servo. The pilot governor valve senses a decrease in the speed of rotation of the common sun gear for the planetary gear unit and responds by interrupting distribution of control pressure to the distributor valve when the speed of the sun gear becomes zero. On a 1–2 upshift from the low speed ratio to the high speed ratio, the intermediate speed ratio brake servo becomes applied and the low speed ratio brake becomes released. The release of the low speed ratio brake, however, is not accomplished until the speed of rotation of the intermediate speed ratio brake drum is zero. This prevents a tie-up in the gear system, which would occur if both brakes were to become applied simultaneously. It provides also a nonsynchronous shift since timing of brake application and brake release is not necessary.

BRIEF DESCRIPTION OF THE FIGURES OF THE DRAWINGS

FIG. 1 shows in schematic form an automatic transmission gear system capable of using the improvement of my invention.

FIG. 2 is a cross section assembly view of a portion of the gear system illustrated schematically in FIG. 1.

FIG. 3 shows a valve system in block diagram form for an automatic transmission of the type illustrated in FIG. 1.

FIG. 4 is a schematic view of a portion of the governor sensing portion of the valve diagram of FIG. 3.

PARTICULAR DESCRIPTION OF THE INVENTION

In FIG. 1 numeral 10 indicates a hydrokinetic torque converter which multiplies engine torque and distributes it to the planetary gear system. It includes a bladed impeller 12, a bladed turbine 14 and a bladed stator 16 arranged in toroidal fluid flow relationship. The impeller 10 includes a shell 18 which is connected to the engine crankshaft 20 for an internal combustion engine 22. The engine has a carburetor 24 having an air fuel mixture flow control valve or throttle valve 26 which is under the control of the vehicle operator.

A positive displacement pump 28 is drivably connected to the impeller 12 and is driven at engine speed. It supplies circuit pressure for the valve system described with reference to FIGS. 3 and 4. It supplies also pressure for the converter 10.

A stationary stator sleeve shaft 30 is connected to transmission housing 32. The stator 16 is journalled on the shaft 30, and it is held from rotating by overrunning brake 34. The stator 16 is capable of freewheeling in the direction of rotation of the impeller 12, but rotation in the opposite direction is inhibited by the brake 34.

Turbine shaft 36 connects the turbine 14 to clutch member 38 as best seen in FIG. 2. Clutch member 38, which is splined to the shaft 36, includes an internally splined clutch drum 40 and an externally splined clutch element 41. A first simplified planetary gear unit 42 includes a ring gear 44, which is externally splined to clutch discs for a forward drive clutch 46. Cooperating clutch discs of the clutch 46 are splined to the internally splined drum 40. The drum 40 defines an annular cylinder 48 in which is positioned an annular piston 50. The piston and cylider cooperate to define a pressure chamber which is supplied with fluid through a pressure feed passage shown in part at 52. Fluid pressure force acting on the piston 50 is transmitted to the multiple disc clutch assembly 46 through a Belleville spring 54 anchored at its outer periphery to the cylinder 48.

Clutch element 41 carries multiple clutch discs which register with clutch discs carried by brake drum 56. This drum is journalled rotatably on stationary sleeve 58, which forms a part of a pump housing wall 60. This in turn is secured to housing support wall 62 bolted to shoulder 64 formed on the transmission housing 66. The wall 32 and the wall 62 cooperate to form a pump chamber, which receives pumping elements 68 drivably connected to the impeller 12 of the converter 10.

The drum 56 comprises an annular cylinder 70, which receives an annular piston 72. These cooperate to define a pressure chamber which is fed with working fluid through passage 74. Clutch discs carried by the drum 56 and clutch element 41 define a multiple disc clutch assembly 76 which is engaged as fluid pressure is emitted behind the piston 72.

The planetary gear assembly includes a common sun gear 78 for each of two planet sets 80 and 82. Clutch member 44 is connected to ring gear 84 of the gear unit 80, and it in turn meshes with planetary pinions 86 carried by a carrier 88, which in turn is connected to power output shaft 90.

Gear unit 82 includes a ring gear 92, planetary pinions 94 and a carrier 96 which rotatably journals the pinions 94, the latter engaging the sun gear 78 and the ring gear 92. Pinions 86 also engage the sun gear 78.

Carrier 96 is adapted to be anchored selectively to the housing 66 by means of an engageable disc brake assembly 98. This brake assembly is applied and released by a fluid pressure operated piston 100, which slidably registers with a pressure cavity formed in the housing 66.

Carrier 96, during low speed operation, serves as a reaction member as reaction torque is distributed from the carrier 96 to the housing 66 through brake assembly 98. Brake drum 56 is surrounded by brake band 104 which can be applied and released by means of a fluid pressure operated servo illustrated schematically in FIG. 1 at 106. This includes a pressure operated piston 108 operating in a cylinder 110. The piston 108 acts through a suitable force transmitting mechanism at the operating end of the brake band 104 to selectively brake the brake drum 56 and the sun gear 78. The brake drum is connected mechanically to the sun gear 78 through a torque transfer drum 112 which surrounds the multiple disc clutch assembly 46 and the front planetary gear unit 80.

A compound governor valve assembly 114 having a primary governor valve section 116 and a secondary valve section 118 is drivably connected to the shaft 90. It produces a pressure signal that is proportional in magnitude to the driven speed of the shaft 90. This signal is used for the purpose of establishing speed ratio shift points by an automatic control valve assembly to be described with reference to the schematic drawing of FIG. 3.

The conrtol valve assembly is located within a sump or oil pan 120, as seen in FIG. 2. It is designated generally by reference character 122.

Brake drum 56 includes an extension 124 on its periphery. This defines an annular trough 126 which is situated so that it is capable of receiving lubricating fluid. As the drum 56 rotates, lubricating fluid is caused to fill the trough 126 so that it rotates to form a rotating annular body of fluid. Situated in this rotating body of fluid is a Pitot tube sensor 128 having a pressure signal sensing inlet situated tangentially with respect to the rotating fluid.

During low speed ratio operation, the intermediate brake band 104 is released, the direct-and-reverse clutch 76 is released, and the forward clutch 46 is applied. During normal forward drive of the low speed ratio, the multiple disc brake assembly 98 may be released. It is applied, however, during operation of the low speed ratio range when hill braking is desired. Under these circumstances turbine torque is delivered through turbine shaft 36 and then through the forward clutch 46 to the ring gear 84. Since the carrier 88 is connected to the power output shaft 90, rotation of the carrier 88 is resisted. This causes rotation of the sun gear 78 to occur in a direction that is opposite to the direction of rotation of the ring gear 84. This then causes ring gear 92 to be driven in the same direction as the direction of rotation of the ring gear 84, as the carrier 96 acts as a reaction member. A split torque delivery path thus is provided through the gearing during the low speed operation, a portion of the torque being distributed to the output shaft from the carrier 88 and the balance of the torque being distributed to the output shaft 90 through the ring gear 92.

It is during this low speed operation that the drum 56 rotates as previously mentioned. It rotates whenever the sun gear 78 rotates. This rotation, of course, causes a rotating ring of fluid to be developed in the trough 126, and this in turn causes a static pressure to be developed in the Pitot tube assembly. This signal is distributed to the valve body 122.

Upon a ratio change from the low speed ratio to the intermediate speed ratio, the intermediate speed ratio brake band is applied by the servo 106. This causes the sun gear 78 to become anchored, thereby permitting it to function as a reaction member. Turbine torque still is delivered to the ring gear 84 through the applied forward clutch 46. Ring gear 84 drives the carrier 88 which in turn drives the output shaft 90 at a speed ratio that is increased relative to the low speed ratio but which is less than 1–1.

To achieve forward drive, high speed ratio operation, both brakes are released and both clutches are applied. This locks together the elements of the planetary gearing so that they rotate in unison with the 1–1 speed ratio. The direction of rotation of the sun gear 78 under these circumstances is in a direction opposite to the direction of rotation during low speed ratio operation.

FIG. 3 shows in block diagram form the control valve elements for controlling the ratio shifts of the gearing of FIG. 1. It includes a manifold pressure operated throttle valve 130 which produces a signal in passage 132 that is proportionate in magnitude to the intake manifold pressure of the internal combustion engine 22. This signal is distributed to the 1–2 shift valve assembly 134 and the 2–3 shift valve assembly 136. The pump 28 supplies regulator valve 138 with operating pressure. This valve functions to maintain a control pressure level in the circuit. Its regulated pressure is distributed to range selector valve 140 and from there it is distributed to the direct-and-reverse clutch through a passage 142 to the 1–2 shift valve assembly through passage 144 to the manual low-and-reverse brake through passage 146 and to 2–3 shift valve assembly 136 through passage 148. The selection of the passages through which pressure distributed by the range selector valve 140 is controlled by the vehicle operator by means of a mechanical shift valve linkage shown schematically at 150.

Governor pressure is distributed to the shift valve assemblies through passage 152. The influence of the governor pressure and the opposing influence of the throttle valve signal in passage 132 controls the shift points at which ratio changes are accomplished. For a particular description of the mode of operation of the typical valve circuit of this type, reference may be made to U.S. Pat. No. 3,393,585. This patent disclosure may supplement this description.

My invention is concerned primarily with the portion of the valve system that produces a synchronous 1–2 upshift. This is illustrated in FIG. 4. It includes four principal components, line pressure control valve 154, a throttle pressure regulating valve 156, a Pitot governor sensing valve 158 and a reverse brake control valve 160.

In some circumstances the valves 154 and 156 may not be required. But if special regulated pressure for the reverse-and-low brake is needed, these valves should be used. Valve 154 includes a valve spool having lands 162 and 164 located in a valve chamber 166. The valve chamber is supplied with fluid pressure through passage 168 which may communicate with passage 170 located on the output side of the regulator valve 138. An exhaust is shown at 173. The valve spool is urged in an upward direction as seen in FIG. 4 by valve spring 174. Feedback pressure from output line pressure 176 is distributed to the upper end of the valve spool.

The pressure in passage 168 is modulated by the valve elements to produce a modified pressure passage 176, the magnitude of which is determined by the calibration of the spring 174. This pressure can be modified further by the valve 156. This includes a valve spool 178 having spaced the lands 180 and 182 slidably situated in a valve chamber 184.

Manifold pressure from passage 132 is distributed to the lower end of the land 182 through passage 186. This urges the valve spool 178 in an upward direction against the opposing influence of a valve spring 188. An exhaust port is shown at 190. Valve spool 178 modulates pressure in passage 176 to produce a resultant modified pressure in passage 192 which is distributed through feedback passage 194 to the upward end of the valve spool 178.

As the intake manifold pressure of the engine increases, the effective pressure produced in passage 192 is increased. This will result in a higher torque capacity for the low-and-reverse brake since it is this pressure that causes the brake to become applied.

Pressure in passage 192 is distributed to the valve 158 which comprises a valve spool 196 which normally is urged in a downward direction by valve spring 198. Valve spool 196 includes lands 200 and 202, which connect selectively the passage 192 to passage 204 or to exhaust port 206. The Pitot tube signal obtained by the Pitot tube assembly 126 is distributed to the lower end of the valve spool 196. When the valve spool 196 assumes an upward position, communication is established between passage 192 and passage 204. When it assumes a downward position, passage 204 is exhausted through port 206. It assumes a downward position under the influence of spring 198 whenever the pressure in passage 208 becomes zero. It becomes zero, as explained previously, whenever the speed of rotation of the sun gear 78 following low speed ratio operation becomes zero. As soon as the Pitot tube pressure becomes available, pressure becomes available to the passage 204, the magnitude of the pressure depending upon the calibration of the valve 156 and 154.

Valve 160 comprises valve lands 212 and 214 which are slidably situated in valve chamber 216 in which are formed internal lands that cooperate with the external lands of the valve spool for valve 160. The valve spool normally is urged in a downward direction by calibrated valve spring 218. In these circumstances it is possible to distribute line pressure from passage 170 to low-and-reverse brake passage 220. The selector valve then can distribute pressure to the low-and-reverse brake whenever it is desired to maintain the brake applied for low or reverse drive operation. If the valve 160 is to function to establish a synchronous 1–2 upshift, however, the passage 220 would be exhausted. Intermediate brake servo pressure is distributed to passage 222 upon the initiation of 1–2 upshift, and this pressure in turn is distributed to the lower end of the valve land 214 thereby bringing the valve 160 into a position that will establish communication between passage 204 and 220. The transmission still is not conditioned for intermediate speed ratio operation, however, because the low-and-reverse brake has not become released. That is, the Pitot tube speed signal acting on the lower end of land 210 maintains valve 158 in a position that will cause communication between passage 204 and 192. As soon as the sun gear stops rotating following initiation of the 1–2 upshift, the speed signal acting on the land 210 becomes zero and the spring 198 then shifts the valve 158 in a downward direction thereby exhausting the passage 204 through the port 206. This immediately releases the reverse-and-low brake thereby allowing the transmission to assume intermediate speed ratio operation in the manner previously described.

Unlike prior art systems, it is not necessary to employ a relatively expensive overrunning coupling for anchoring the carrier. Since the low speed ratio brake becomes released immediately, there is no possibility of simultaneous engagement of the low speed ratio brake and the intermediate speed ratio brake band.

If the 2–1 downshift is desired, then an appropriate 2–1 downshift signal can be applied to the upper end of the land 212 through the passage 224. This will overrule the opposing influence of the intermediate servo pressure in passage 222. Line 170 then will be brought into communication with passage 220 as the low-and-reverse brake becomes applied. The same pressure signal that is distributed through passage 224 is distributed also to the 1–2 shift valve assembly, thereby forcing that valve assembly to its own downshift position.

Having thus described a preferred form of my invention, what I claim and desire to secure by United States Letters Patent is:

1. In a power transmission mechanism having planetary gearing adapted to establish plural torque delivery paths between a drivng member and a driven member, first brake means for anchoring one element of said gearing during operation in the low speed ratio, second brake means for anchoring another element of said gearing during operation in a higher speed ratio, a third element of said gearing being adapted to be connected to said driving member for accommodating delivery of driving torque to said gearing, means defining an annular fluid trough connected to said other gear element, a Pitot tube sensor registering with said trough for developing a pressure signal that is proportional in magnitude to the speed of rotation of said trough and said other gear element, a pressure source, conduit structure connecting said first brake means and said pressure source, and Pitot governor sensing valve means situated in and partly defining said conduit structure for selectively establishing and disestablishing a fluid connection between said pressure source and said first brake means thereby releasing said first brake means as the speed of rotation of said other gear element approaches zero during a speed ratio change from the low speed ratio to the higher speed ratio.

2. The combination as set forth in claim 1 wherein said Pitot valve means comprises a shift valve, a branch passage communicating with said conduit structure, said shift valve, upon assuming one position, establishing communication between said branch passage and said first brake means, another branch portion of said conduit structure also communicating with said shaft valve, said shift valve upon assuming another position, establishing communication between said other branch portion and said first brake means, and a fluid connection between said second brake means and said shift valve whereby the latter is actuated to said other position upon application of said second brake means, said Pitot tube sensing valve means establishing and disestablishing communication through said second branch passage portion.

3. The combination as set forth in claim 2 wherein communication between said other branch passage portion is interrupted when the speed signal developed by said Pitot valve means becomes zero following the application of said second brake means whereby said first brake means is automatically disengaged during a 1–2 upshift.

4. The combination as set forth in claim 1 wherein said valve means includes a valve responsive to the torque requirements of said transmission mechanism and situated in and partly defining said conduit structure for regulating the magnitude of the pressure made available to said valve means in accordance with the torque requirements whereby the capacity of said first brake means is increased when the torque requirements are increased.

5. The combination as set forth in claim 2 wherein said valve means includes a valve responsive to the torque requirements of said transmission mechanism and situated in and partly defining said conduit structure for regulating the magnitude of the pressure made available to said valve means in accordance with the torque requirements whereby the capacity of said first brake means is increased when the torque requirements are increased.

6. The combination as set forth in claim 3 wherein said valve means includes a valve responsive to the torque requirements of said transmission mechanism and situated in and partly defining said conduit structure for regulating the magnitude of the pressure made available to said valve means in accordance with the torque requirements whereby the capacity of said first brake means is increased when the torque requirements are increased.

7. The combination as set forth in claim 2 wherein said shift valve includes spring means for normally urging said shift valve toward said one position, and a kickdown pressure passage communicating with said shift valve to establish a pressure port that complements the force of said spring to force a 2-1 downshift independently of the operation of the Pitot valve means.

8. The combination as set forth in claim 3 wherein said shift valve includes spring means for normally urging said shift valve toward said one position, and a kickdown pressure passage communicating with said shift valve to establish a pressure port that complements the force of said spring to force a 2-1 downshift independently of the operation of the Pitot valve means.

9. The combination as set forth in claim 4 wherein said shift valve includes spring means for normally urging said shift valve toward said one position, and a kickdown pressure passage communicating with said shift valve to establish a pressure port that complements the force of said spring to force a 2-1 downshift independently of the operation of the Pitot valve means.

10. The combination as set forth in claim 5 wherein said shift valve includes spring means for normally urging said shift valve toward said one position, and a kickdown pressure passage communicating with said shift valve to establish a pressure port that complements the force of said spring to force a 2-1 downshift independently of the operation of the Pitot valve means.

11. The combination as set forth in claim 6 wherein said shift valve includes spring means for normally urging said shift valve toward said one position, and a kickdown pressure passage communicating with said shift valve to establish a pressure port that complements the force of said spring to force a 2-1 downshift independently of the operation of the Pitot valve means.

12. In a power transmission mechanism having planetary gearing adapted to establish plural torque delivery paths between a driving member and a driven member, first brake means for anchoring one element of said gearing during operation in one speed ratio, second brake means for anchoring another element of said gearing during operation in another speed ratio, a third element of said gearing being adapted to be connected to said driving member for accommodating delivery of driving torque to said gearing, a rotary speed sensor means for developing a pressure signal that is proportional in magnitude to the speed of rotation of said other gear element, a pressure source, conduit structure connecting said first brake means and said pressure source, pressure signal sensitive valve means situated in and partly defining said conduit structure for selectively establishing a fluid connection between said pressure source and said first brake means thereby releasing said first brake means as the speed of rotation of said other gear element approaches zero during a speed ratio change from one speed ratio to another speed ratio.

13. In a power transmission mechanism having planetary gearing adapted to establish plural torque delivery paths between a driving member and a driven member, first brake means for anchoring one element of said gearing during operation in the low speed ratio, second brake means for anchoring another element of said gearing during operation in a higher speed ratio, a third element of said gearing being adapted to be connected to said driving member for accommodating delivery of driving torque to said gearing, a rotary speed sensor means for developing a pressure signal that is proportional in magnitude to the speed of rotation of said other gear element, a pressure source, conduit structure connecting said first brake means and said pressure source, pressure signal sensitive valve means situated in and partly defining said conduit structure for selectively establishing a fluid connection between said pressure source and said first brake means thereby releasing said first brake means as the speed of rotation of said other gear element approaches zero during a speed ratio change from the low speed ratio to the higher speed ratio.

References Cited
UNITED STATES PATENTS

| | | | |
|---|---|---|---|
| 2,932,990 | 4/1960 | Cartwright et al. | 74—869X |
| 3,000,230 | 9/1961 | Froslie | 74—869 |
| 3,101,012 | 8/1963 | Christenson et al. | 74—752 |
| 3,308,676 | 3/1967 | Zundel et al. | 74—869X |
| 3,313,183 | 4/1967 | Bailey et al. | 74—752 |
| 3,330,170 | 7/1967 | Rains et al. | 74—752 |
| 3,387,508 | 6/1968 | Searles et al. | 74—864 |
| 3,393,585 | 7/1968 | Pierce, Jr. | 74—864 |

ARTHUR T. McKEON, Primary Examiner

U.S. Cl. X.R.

74—752